(12) United States Patent
Zhang et al.

(10) Patent No.: US 12,294,937 B2
(45) Date of Patent: May 6, 2025

(54) METHOD AND APPARATUS FOR WIRELESS COMMUNICATION

(71) Applicant: Lenovo (Beijing) Ltd., Beijing (CN)

(72) Inventors: Yuantao Zhang, Dongcheng District (CN); Hongmei Liu, Changping District (CN); Zhi Yan, Xicheng District (CN); Yingying Li, Haidian District (CN); Haipeng Lei, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 435 days.

(21) Appl. No.: 17/773,547

(22) PCT Filed: Nov. 15, 2019

(86) PCT No.: PCT/CN2019/118802
§ 371 (c)(1),
(2) Date: Apr. 29, 2022

(87) PCT Pub. No.: WO2021/092900
PCT Pub. Date: May 20, 2021

(65) Prior Publication Data
US 2022/0394601 A1    Dec. 8, 2022

(51) Int. Cl.
| | |
|---|---|
| *H04W 48/00* | (2009.01) |
| *H04L 5/00* | (2006.01) |
| *H04W 48/10* | (2009.01) |
| *H04W 48/16* | (2009.01) |

(52) U.S. Cl.
CPC ........... *H04W 48/16* (2013.01); *H04L 5/0053* (2013.01); *H04W 48/10* (2013.01); *H04L 5/0051* (2013.01)

(58) Field of Classification Search
CPC ...... H04W 48/16; H04W 48/10; H04L 5/0053
See application file for complete search history.

(56) References Cited

U.S. PATENT DOCUMENTS

| | | | |
|---|---|---|---|
| 10,973,013 B2* | 4/2021 | Nogami | H04L 5/0044 |
| 2018/0375628 A1 | 12/2018 | Lee et al. | |
| 2018/0376511 A1* | 12/2018 | Tsai | H04W 74/0833 |

(Continued)

FOREIGN PATENT DOCUMENTS

| | | |
|---|---|---|
| CN | 108282290 A | 4/2018 |
| CN | 110063081 A | 7/2019 |
| WO | 2021010786 A1 | 1/2021 |

OTHER PUBLICATIONS

19952834, "Extended European Search Report", EP Application No. 19952834, Jul. 11, 2023, 10 pages.

(Continued)

*Primary Examiner* — Erika A Washington
(74) *Attorney, Agent, or Firm* — FIG. 1 Patents

(57) ABSTRACT

The present disclosure is related to a method and apparatus for wireless communication. A method performed by a user equipment, comprising: determining a first control resource set based on configuration information associated with a second control resource set; and determining a first search space based on configuration information associated with a second search space, wherein the first control resource set is associated with the first search space and the second control resource set is associated with the second search space.

20 Claims, 9 Drawing Sheets

(56) References Cited

U.S. PATENT DOCUMENTS

2019/0140776 A1    5/2019  Seo et al.
2020/0107321 A1*  4/2020  Yang ..................... H04W 72/23

OTHER PUBLICATIONS

"International Search Report and Written Opinion", PCT Application No. PCT/CN2019/118802, Aug. 20, 2020, 6 pages.

Ericsson, "Correction on search space sharing", 3GPP TSG-RAN WG1 Meeting #96, R1-1903465, Athens, Greece [retrieved Jun. 9, 2022]. Retrieved from the Internet <https://www.3gpp.org/DynaReport/TDocExMtg-R1-96--32821.htm>., Feb. 2019, 11 pages.

Huawei, et al., "Correction on RNTI used for UE specific PDSCH/Pusch", 3GPP TSG-RAN WG1 Meeting #99, R1-1913124, Reno, NV, USA [retrieved Jun. 9, 2022]. Retrieved from the Internet <https://www.3gpp.org/ftp/Meetings_3GPP_SYNC/RAN1/Docs/?sortby=sizerev>., Nov. 2019, 10 pages.

PCT/CN2019/118802, "International Preliminary Report on Patentability", PCT Application No. PCT/CN2019/118802, May 27, 2022, 5 pages.

* cited by examiner

METHOD AND APPARATUS FOR WIRELESS COMMUNICATION

TECHNICAL FIELD

The present disclosure generally relates to wireless communication technology, and more particularly to wireless communication for User Equipment (UE) supporting Internet of Things (IoT) applications.

BACKGROUND

In 3rd Generation Partnership Project (3GPP) Release 17, New Radio (NR) based IoT applications are also called NR-lite, NR-light, NR Machine Type Communication (MTC), NR IoT or massive MTC (mMTC). 3GPP NR based IoT applications are targeted to address new use cases with IoT-type requirements that cannot be met by LTE enhanced Machine Type Communication (eMTC) applications or LTE Narrow Band (NB)-IoT applications. For example, the IoT-type requirements include low-complexity, enhanced coverage, long battery life, massive number of devices, higher data rate and/or lower latency.

UEs supporting NR IoT applications may be referred to as NR-Light UEs. UEs that do not support NR IoT applications may be referred to as legacy UEs. If not specified, a UE may refer to either a NR-Light UE or a legacy UE. Compared to the legacy UEs, NR-Light UEs may support reduced UE bandwidth to enable several Mbps to tens of Mbps downlink throughput. For example, the bandwidth of NR-Light UEs may be lower than 40 MHz, may be lower than 20 MHz, or may be limited to 5 or 10 MHz. There is a need for handling communications of NR-Light UEs with reduced bandwidth.

SUMMARY

Some embodiments of the present disclosure provide a method performed by a user equipment. The method may include: determining a first control resource set based on configuration information associated with a second control resource set; and determining a first search space based on configuration information associated with a second search space, wherein the first control resource set is associated with the first search space and the second control resource set is associated with the second search space.

In some embodiments of the present disclosure, the first control resource set and the second control resource set may have the same numerology. The number of symbols for the first control resource set may be determined based on the number of symbols for the second control resource set. The first search space and the second search space may have the same physical downlink control channel (PDCCH) monitoring periodicity. A first monitoring occasion for the first search space may be located in a first slot, a second monitoring occasion for the second search space may be located in a second slot, and the first slot may be located right after or right before the second slot. Downlink control information (DCI) transmitted in the first search space and the second search space may be the same.

In some embodiments of the present disclosure, the method may further include detecting DCI within the first control resource set; determining a first frequency domain resource allocation within a bandwidth of the first control resource set based on the DCI; and detecting a physical downlink shared channel (PDSCH) transmission based on the first frequency domain resource allocation. In some embodiments of the present disclosure, the method may further include storing data transmitted within a bandwidth of the first control resource set in the second control resource set. The method may further include if the step of detecting the DCI is failed: combining soft information for DCI transmission within the first control resource set with soft information for DCI transmission within the second control resource set and obtaining the DCI based on the combined soft information. The method may further include if the step of detecting the PDSCH transmission is failed: determining a second frequency domain resource allocation based on the DCI; combining soft information for PDSCH transmission within the first control resource set according to the first frequency domain resource allocation with soft information for PDSCH transmission within the first control resource set according to the second frequency domain resource allocation; and obtaining the PDSCH transmission based on the combined soft information. The method may further include receiving the PDSCH transmission.

In some embodiments of the present disclosure, determining the first frequency domain resource allocation based on the DCI may include: determining a second frequency domain resource allocation within a bandwidth of the second control resource set based on the DCI; and deducing the first frequency domain resource allocation based on the second frequency domain resource allocation. The first frequency domain resource allocation may correspond to a first number of virtual resource blocks (VRBs) starting from a first VRB, the second frequency domain resource allocation may correspond to a second number of VRBs starting from a second VRB. The method may further include determining a first value based on the second number, a number of symbols for the first control resource set, and a number of symbols for the second control resource set.

In some embodiments of the present disclosure, if the second VRB is within a bandwidth of the first control resource set, the second VRB may correspond to a third VRB in a bandwidth of the first control resource set; and if the first value is less than or equal to a difference between a number of VRBs within the bandwidth of the first control resource set and an index of the third VRB, the first VRB may be the third VRB and the first number may be equal to the first value. In some embodiments of the present disclosure, if the second VRB is within a bandwidth of the first control resource set, the second VRB may correspond to a third VRB in a bandwidth of the first control resource set; and if the first value is greater than a difference between a number of VRBs within the bandwidth of the first control resource set and an index of the third VRB, the first VRB may be a VRB with least frequency in the first control resource set, and the first number may be equal to a minimum of a number of VRBs within the bandwidth of the first control resource set and the first value. In some embodiments of the present disclosure, if the second VRB is outside a bandwidth of the first control resource set, the first VRB may be a VRB with least frequency in the first control resource set, and the first number may be equal to a minimum of a number of VRBs within the bandwidth of the first control resource set and the first value.

In some embodiments of the present disclosure, the method may further include mapping the first number of VRBs to a plurality of physical resource blocks (PRBs) in the first control resource set, wherein the mapping is non-interleaved or interleaved.

Some embodiments of the present disclosure provide a method performed by a base station. The method may include: broadcasting configuration information indicating a second control resource set and a second search space, wherein the second search space is associated with the second control resource set; and transmitting a downlink control channel within a first control resource set in a first search space, wherein the first control resource set is based on the second control resource set and the first search space is based on the second search space.

In some embodiments of the present disclosure, the first control resource set and the second control resource set may have the same numerology. The number of symbols for the first control resource set may be determined based on the number of symbols for the second control resource set. The first search space and the second search space may have the same physical downlink control channel (PDCCH) monitoring periodicity. A first monitoring occasion for the first search space may be located in a first slot, a second monitoring occasion for the second search space may be located in a second slot, and the first slot may be located right after or right before the second slot. The control information on the downlink control channel transmitted in the first search space may be the same as the control information on a downlink control channel transmitted in the second search space.

In some embodiments of the present disclosure, the method may further include determining a first frequency domain resource allocation within a bandwidth of the first control resource set based on the control information; and transmitting a downlink shared channel based on the first frequency domain resource allocation. Determining the first frequency domain resource allocation based on the control information may include: determining the first frequency domain resource allocation based on a second frequency domain resource allocation, wherein the second frequency domain resource allocation is within a bandwidth of the second control resource set indicated by the control information. The first frequency domain resource allocation may correspond to a first number of virtual resource blocks (VRBs) starting from a first VRB, the second frequency domain resource allocation may correspond to a second number of VRBs starting from a second VRB. The method may further include determining a first value based on the second number, a number of symbols for the first control resource set, and a number of symbols for the second control resource set.

In some embodiments of the present disclosure, if the second VRB is within a bandwidth of the first control resource set, the second VRB may correspond to a third VRB in a bandwidth of the first control resource set; and if the first value is less than or equal to a difference between a number of VRBs within the bandwidth of the first control resource set and an index of the third VRB, the first VRB may be the third VRB and the first number may be equal to the first value.

In some embodiments of the present disclosure, if the second VRB is within a bandwidth of the first control resource set, the second VRB may correspond to a third VRB in a bandwidth of the first control resource set; and if the first value is greater than a difference between a number of VRBs within the bandwidth of the first control resource set and an index of the third VRB, the first VRB may be a VRB with least frequency in the first control resource set, and the first number may be equal to a minimum of a number of VRBs within the bandwidth of the first control resource set and the first value.

In some embodiments of the present disclosure, if the second VRB is outside a bandwidth of the first control resource set, the first VRB may be a VRB with least frequency in the first control resource set, and the first number may be equal to a minimum of a number of VRBs within the bandwidth of the first control resource set and the first value.

In some embodiments of the present disclosure, the method may further include mapping the first number of VRBs to a plurality of physical resource blocks (PRBs) in the first control resource set, wherein the mapping is non-interleaved or interleaved.

Some embodiments of the present disclosure provide an apparatus. According to some embodiments of the present disclosure, the apparatus may include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3GPP 5G (NR), 3GPP LTE Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
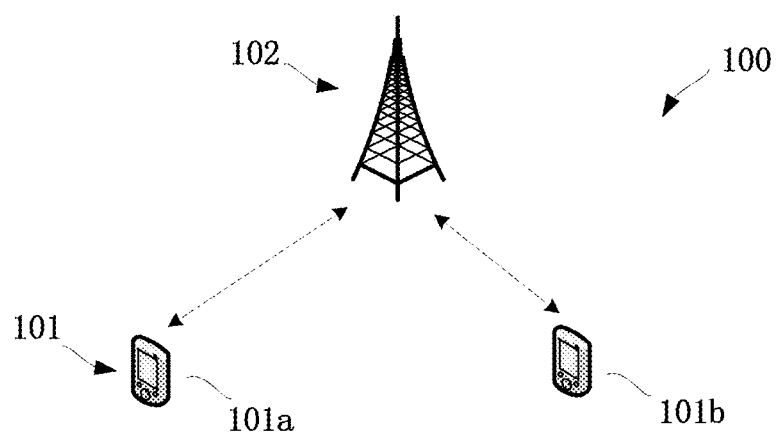
FIG. 1 illustrates a schematic diagram of a wireless communication system in accordance with some embodiments of the present disclosure.

FIG. 1 illustrates a schematic diagram of a wireless communication system in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present disclosure, each of the UE(s) 101 may deploy an IoT application, an eMBB application and/or a URLLC application. For instance, UE 101a may implement an IoT application and may be named as an IoT UE, while UE 101b may implement an eMBB application and/or a URLLC application and may be named as an eMBB UE, an URLLC UE, or an eMBB/URLLC UE. It is contemplated that the specific type of application(s) deployed on the UE(s) 101 may be varied and not limited.

The BS 102 may be distributed over a geographic region. In certain embodiments of the present disclosure, each of the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol, wherein BS 102 may transmit data using an OFDM modulation scheme on the DL and the UE(s) 101 may transmit data on the UL using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 may communicate using other communication protocols, such as the IEEE 802.11 family of wireless communication protocols. Further, in some embodiments of the present disclosure, the BS 102 may communicate over licensed spectrums, whereas in other embodiments, the BS 102 may communicate over unlicensed spectrums. The present disclosure is not intended to be limited to the implementation of any particular wireless communication system architecture or protocol. In yet some embodiments of present disclosure, the BS 102 may communicate with the UE(s) 101 using the 3GPP 5G protocols.

In a NR communication system(s), a Synchronization Signal Block (SSB) is employed to indicate downlink (DL) reference resource(s). The SSB may include a Primary Synchronization Signal (PSS), a Secondary Synchronization Signal (SSS), and a Physical Broadcast Channel (PBCH). A base station may periodically transmit one or more SSBs in one or more radio frame periods. In some embodiments of the present disclosure, SSB for legacy UEs may be reused for NR-Light UEs.

Figure 2:
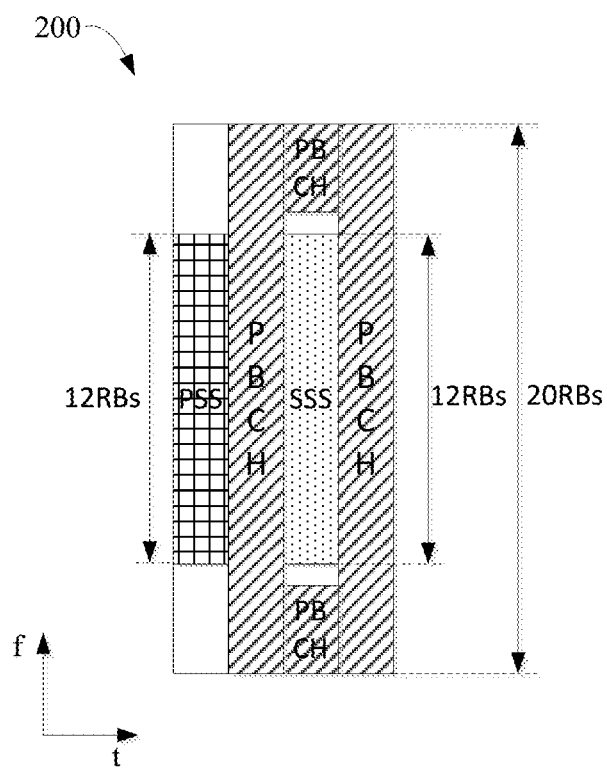
FIG. 2 illustrates an exemplary SSB structure in accordance with some embodiments of the present disclosure.

FIG. 2 illustrates an exemplary SSB structure 200 in accordance with some embodiments of the present disclosure. As shown in FIG. 2, an SSB block may include one PSS block, one SSS block and some PBCH blocks. The SSB block may occupy four consecutive Orthogonal Frequency Division Multiplexing (OFDM) symbols, and PSS, PBCH, SSS/PBCH and PBCH are respectively transmitted at these OFDM symbols. The SSB block may be designed to occupy 20 resource blocks (RBs), and the PSS block and SSS block may be designed to occupy 12 RBs. The actual bandwidth of the SSB depends on numerology. For example, in the case that the SSB is transmitted using 15 kHz SubCarrier Spacing (SCS), the bandwidth of the SSB is 3 MHz. Hereinafter, the bandwidth of a radio resource or a device may be described in the unit of resource block or MHz. In the case that a bandwidth is described in the unit of resource blocks, persons skilled in the art can readily determine the actual bandwidth in the unit of MHz depending on numerology; and vice versa.

As mentioned above, a NR-Light UE may support a relatively narrower bandwidth than the one supported by the legacy UE. However, generally, a NR-Light UE may support a bandwidth that is greater than or equal to the bandwidth of an SSB. For example, a NR-Light UE may occupy 24 PRBs, and may support a bandwidth of 3.6 MHz (i.e., 24 PRBs with 15 kHz SCS) or a bandwidth of 7.2 MHz (i.e., 24 PRBs with 30 kHz SCS). Therefore, the bandwidth of a NR-Light UE may be able to accommodate an SSB. However, other problems caused by reduced bandwidth of NR-Light UEs may need to be addressed and will be discussed in detail in the following text.

It should be understood that the SSB structure shown in FIG. 2 is only for illustrative purposes, and should not be construed as limiting the embodiments of the present disclosure. An SSB may have different structures and include different blocks in some other embodiments of the present disclosure. In the embodiments of the present disclosure, the PSS, SSS, and PBCH may have different or the same functions as the PSS, SSS, and PBCH in the prior art (for example, LTE), which is not limited in the present disclosure.

In some embodiments of the present disclosure, PBCH may carry a Master Information Block (MIB). A terminal device (e.g., a NR-Light UE or a legacy UE) may detect the MIB from the PBCH, and may acquire information regarding a Control Resource Set (e.g., control resource set zero or CORESET #0) configuration and search space (e.g., search space #0 associated with CORESET #0) configuration from, for example, the "pdcch-ConfigSIB1" field of the MIB. The formats for the MIB are defined in the 3GPP specification TS 38.331.

A Control Resource Set (CORESET) is a time-frequency resource where a UE attempts to decode a downlink control channel in one or more search spaces. For example, a UE may decode a Physical Downlink Control Channel (PDCCH) in one or more search spaces associated with a CORESET.

In some examples, the CORESET configuration may indicate the related information of a CORESET, e.g., the frequency location and the size of the CORESET in terms of number of Physical Resource Blocks (PRBs) and number of OFDM symbols. For example, a UE may obtain the frequency-dimension configuration of the Physical Downlink Control Channel (PDCCH) from the CORESET configuration, e.g., the number of physical resource blocks (PRBs) and the location where the CORESET is located in the frequency domain, and the number of OFDM symbols in the CORESET. The PDCCH may carry Downlink Control Information (DCI), which may indicate a Physical Downlink Shared Channel (PDSCH) carrying Remaining Minimum System Information (RMSI). RMSI may also be referred to as System Information Block1 (SIB1), and the said DCI may be referred to as SIB1 DCI.

In some examples, the search space configuration may indicate the related information of a CORESET corresponding to a search space, e.g., where the CORESET is located within a slot (monitoring symbol) and how often the CORESET occurs (monitoring periodicity and offset). For example, a UE may obtain the time-dimension configuration of the PDCCH from the search space configuration, e.g., the occasion periodicity (also referred to as "PDCCH monitoring periodicity") and the monitoring slots deduced from the monitoring periodicity and offset (also referred to as "PDCCH monitoring occasion"). The PDCCH monitoring periodicity may be at a slot level. The UE may monitor PDCCH candidate(s) in the search space. For example, the UE may be configured to monitor the PDCCH every 4 slots and search the PDCCH from the first OFDM symbol in the monitored slot. Other parameters may also be included in the search space configuration.

The DCI information in a PDCCH may be transmitted using one or more Control Channel Elements (CCE). A CCE may include a group of resource element groups (REGs), for example, 6 REGs. Each REG may represent, for example, one Resource Block (RB) in a frequency domain and one OFDM symbol in a time domain. The use of multiple CCEs may be referred to as an Aggregation Level (AL). Depending on different channel conditions and coverage requirements, a PDCCH may include, for example, 1, 2, 4, 8 or 16 Control Channel Elements (CCEs), which corresponds to AL 1, AL 2, AL 4, AL 16, respectively.

Figure 3:
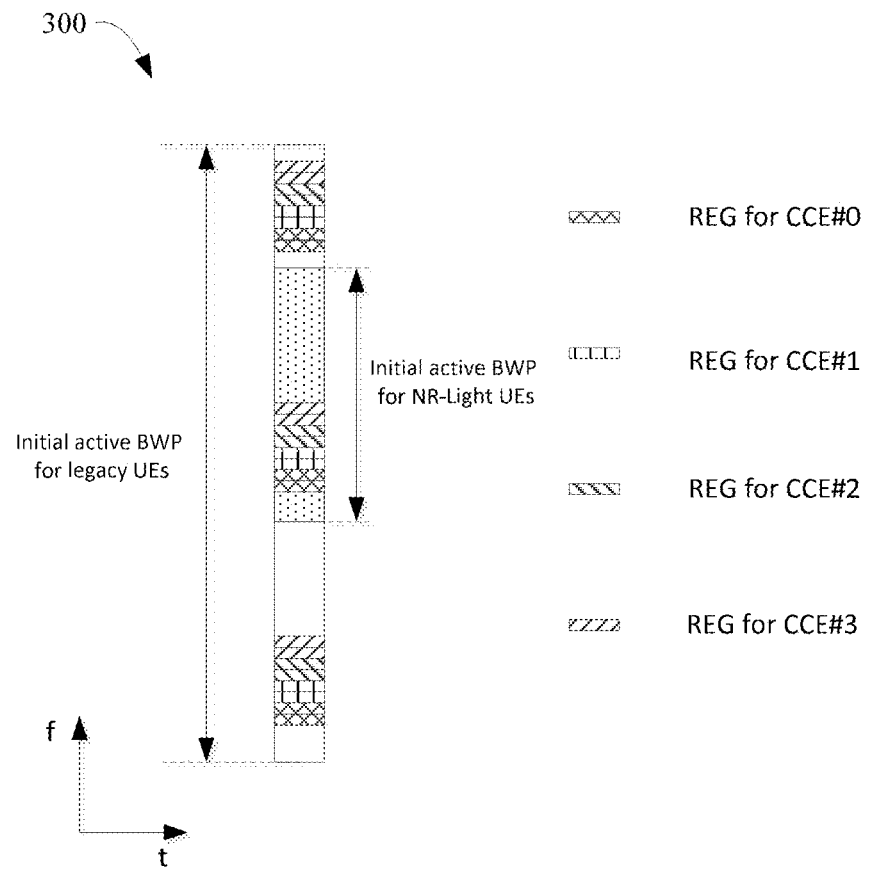
FIG. 3 illustrates exemplary radio resources in accordance with some embodiments of the present disclosure.

FIG. 3 illustrates exemplary OFDM radio resources in accordance with some embodiments of the present disclosure.

Referring to FIG. 3, a legacy UE may support an initial active bandwidth (e.g., indicated as "Initial active BWP for legacy UEs" in FIG. 3) for initial access before an RRC connection is established. REGs are spread in the frequency domain for CCEs used for transmitting, for example, Downlink Control Information (DCI) for RMSI or SIB1. In the example of FIG. 3, Aggregation Level (AL) 4 is employed. Therefore, there are 4 CCEs (i.e., CCE #0, CCE #1, CCE #2, and CCE #3 in FIG. 3) used for transmitting the DCI.

A NR-Light UE may support a relatively narrower bandwidth (e.g., indicated as "Initial active BWP for NR-Light UEs" in FIG. 3) than the one supported by the legacy UE. For example, the bandwidth of a control resource set may range from 24 PRBs to 96 PRBs, depending on the specific configuration. In some configurations, the control resource set zero (i.e., CORESET #0) may define an initial active bandwidth of 48 PRBs. In contrast, the bandwidth of a NR-Light UE may be configured as 24 PRBs. Such bandwidth configuration may not be able to accommodate CCEs or REGs for DCI transmission. For example, as shown in FIG. 3, only a part of the REGs for DCI transmission is located within the initial BandWidth Part (BWP) for NR-Light UEs. As a result, a NR-Light UE may receive only a part of the CCEs that are transmitted within the relatively narrower bandwidth supported. This may suggest that the NR-Light UE may have to receive the DCI at a lower aggregation level. As a consequence, DCI detection performance would be degraded. This degradation may be even worse since NR-light UEs might be equipped with a fewer number of receive antennas.

In some scenarios, even if that the NR-Light UE may detect the DCI (e.g., from the REGs for DCI transmission within the bandwidth of the NR-Light UE), the NR-Light UE may still fail to detect the SIB1 scheduled by the DCI for similar reasons as stated above, that is, the SIB1 may be scheduled in resources that are outside of the bandwidth supported by the NR-Light UE.

There is a need for resolving the above issues caused by limited bandwidth of NR-Light UEs. One solution to the above problems is that the base station should always configure a control resource set (e.g., CORESET #0) within the bandwidth of NR-Light UEs. In this way, the NR-Light UEs may successfully perform DCI detection and SIB1 reception. However, this may not be favorable to legacy UEs.

Another solution is to introduce a new control resource set and a new search space for NR-light UEs to ensure successful DCI detection and/or SIB reception. The solution will be described in detail in the following text with respect to the accompanying drawings.

In some embodiments of the present disclosure, a new control resource set CORESET #0A and a new search space #0A associated with CORESET #0A are introduced for NR-Light UEs. The configurations of CORESET #0A and search space #0A are deduced or determined based on those of CORESET #0 and search space #0, respectively, and will not be transmitted or signaled from a base station to UEs (including both NR-Light UEs and legacy UEs). However, configurations of CORESET #0 and search space #0 will be transmitted or signaled from a base station to UEs. The following are some principles for determining CORESET #0A and search space #0A:
  (a) CORESET #0A is within the bandwidth (BW) of CORESET #0 and has the same numerology as CORESET #0.
  (b) The slots for UE(s) to monitoring search space #0A are associated with the PDCCH monitoring occasions for search space #0. For example,
    i. the PDCCH monitoring periodicity for search space #0A is the same as that for search space #0; and
    ii. the PDCCH monitoring occasions for search space #0A are located in the slots, for example, right after or right before those for search space #0.

Regarding principle (a), in some embodiments of the present disclosure, the number of symbols for CORESET #0A may be determined by the number of symbols configured for CORESET #0. The rationale here is that the highest achievable aggregation level supported by CORESET #0A shall be at least the same as that supported by CORESET #0. Assuming that a communication system supports a maximum aggregation level of AL 16, Table 1 provides some examples employing the above principles for determining CORESET #0A based on CORESET #0. It should be understood that a communication system may support a maximum aggregation level higher or lower than AL 16, which is not limited in the present disclosure.

TABLE 1

Associated CORESET#0 and CORESET#0A in terms of time domain OFDM symbols

| CORESET#0 BW | CORESET#0A BW | CORESET#0 No. of symbols | CORESET#0A No. of symbols | Supported max. AL for CORESET#0 |
|---|---|---|---|---|
| 24 PRBs | 24 PRBs | 1 | 1 | 4 |
|  |  | 2 | 2 | 8 |
|  |  | 3 | 3 |  |
| 48 PRBs | 24 PRBs | 1 | 2 | 8 |
|  |  | 2 | 4 | 16 |
|  |  | 3 | 4 |  |
| 96 PRBs | 24 PRRs | 1 | 4 | 16 |
|  |  | 2 | 4 |  |
|  |  | 3 | 4 |  |

In the above table, it is assumed that the bandwidth (BW) of CORESET #0 may be configured as 24 PRBs, 48 PRBs, and 96 PRBs, respectively, and the number of OFDM symbols occupied by CORESET #0 in time domain may be 1, 2, or 3 symbols. It should be understood that the bandwidth of CORESET #0 and the OFDM symbols occupied by CORESET #0 may have different values, which is not limited in the present disclosure. Similarly, the bandwidth (BW) of CORESET #0A may have different values besides 24 PRBs as listed in the above table.

In the example where the bandwidth of CORESET #0 is 48 PRBs and CORESET #0 occupies 1 OFDM symbol, it can be determined that the maximum aggregation level supported by CORESET #0 is AL 8. As mentioned above, the highest achievable aggregation level supported by CORESET #0A shall be at least the same as that supported by CORESET #0. To satisfy this requirement, assuming that the bandwidth of CORESET #0A is 24 PRBs, it can be determined that CORESET #0A may occupy at least 2 OFDM symbols, as listed in the above table.

Similarly, in the example where the bandwidth of CORESET #0 is 48 PRBs and CORESET #0 occupies 2 OFDM symbols, it can be determined that the maximum aggregation level supported by CORESET #0 is AL 16. To satisfy the aggregation level requirement, assuming that the bandwidth of CORESET #0A is 24 PRBs, it can be determined that CORESET #0A may occupy at least 4 OFDM symbols, as listed in the above table.

In the example where the bandwidth of CORESET #0 is 48 PRBs and CORESET #0 occupies 3 OFDM symbols, the maximum aggregation level supported by CORESET #0 is AL 16 since it is assumed that the communication system only supports a maximum aggregation level of AL 16. To satisfy the aggregation level requirement, assuming that the bandwidth of CORESET #0A is 24 PRBs, it can be determined that CORESET #0A may occupy at least 4 OFDM symbols, as listed in the above table.

As mentioned above, a base station may configure CORESET #0 and search space #0 for UEs and may transmit the same to the UEs. Accordingly, a UE may receive a PBCH and may detect a MIB from the PBCH. The UE may acquire CORESET #0 configuration and search space #0 configuration from the MIB.

In some embodiments of the present disclosure, the UE may determine whether to detect CORESET #0A based on its capabilities and the above configurations. For example, the UE may determine not to detect CORESET #0A if the bandwidth supported by the UE is greater than the bandwidth configured for CORESET #0, which generally suggests that the UE can detect CORESET #0. The UE may determine to detect CORESET #0A if the bandwidth supported by the UE is lower than or equal to the bandwidth configured for CORESET #0. In some embodiments of the present disclosure, the UE may be preconfigured to detect or not detect CORESET #0A regardless of its capabilities. For example, a NR-light UE may be preconfigured to always detect CORESET #0A, and a legacy UE may be preconfigured to always not detect CORESET #0A.

The UE may determine the configurations of CORESET #0A and search space #0A based on the configurations of CORESET #0 and search space #0 as described above. The UE may then detect CORESET #0A in search space #0A to obtain PDCCH. The PDCCH may carry SIB1 DCI in the manner, for example, as shown in FIG. 3. Since the DCI transmitted in CORESET #0A is the same as the one transmitted in CORESET #0, the UE may determine frequency domain resource allocation in the CORESET #0 based on the DCI. However, since the DCI is defined based on the bandwidth of CORESET #0, to obtain a corresponding frequency domain resource allocation in CORESET #0A, the UE may apply the frequency domain resource allocation in the CORESET #0 defined based on the DCI to the bandwidth of CORESET #0A. The UE may then allocate and detect SIB1 in CORESET #0A based on the corresponding frequency domain resource allocation in CORESET #0A.

In some embodiments of the present disclosure, depending on UE capability, the UE may perform a soft combination to improve the performance of SIB1 DCI detection and/or SIB1 detection. For example, the UE may buffer data transmitted in CORESET #0 within the bandwidth of CORESET #0A. Referring back to FIG. 2, in this way, the UE may obtain, for example, REGs for SIB1 scheduling in the bandwidth of CORESET #0A, which may indicate at least a part of DCI. The UE may soft combine the at least a part of DCI (soft information for DCI transmission in CORESET #0) and the soft information for DCI transmission in CORESET #0A to improve the performance of DCI detection. Persons skilled in the art can readily perform soft combination based on the soft information. Similarly, the UE may soft combine information for SIB1 to improve the performance of SIB1 detection. The details regarding the above soft combinations will be further described in the following text.

Figure 4:
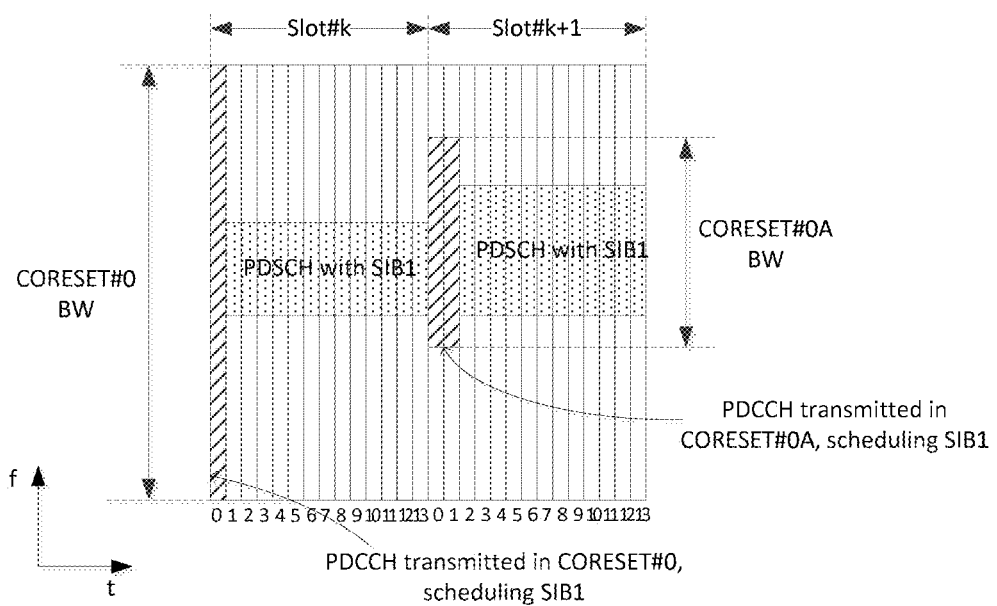
FIG. 4 illustrates exemplary radio resources allocation in accordance with some embodiments of the present disclosure.
Figure 5:
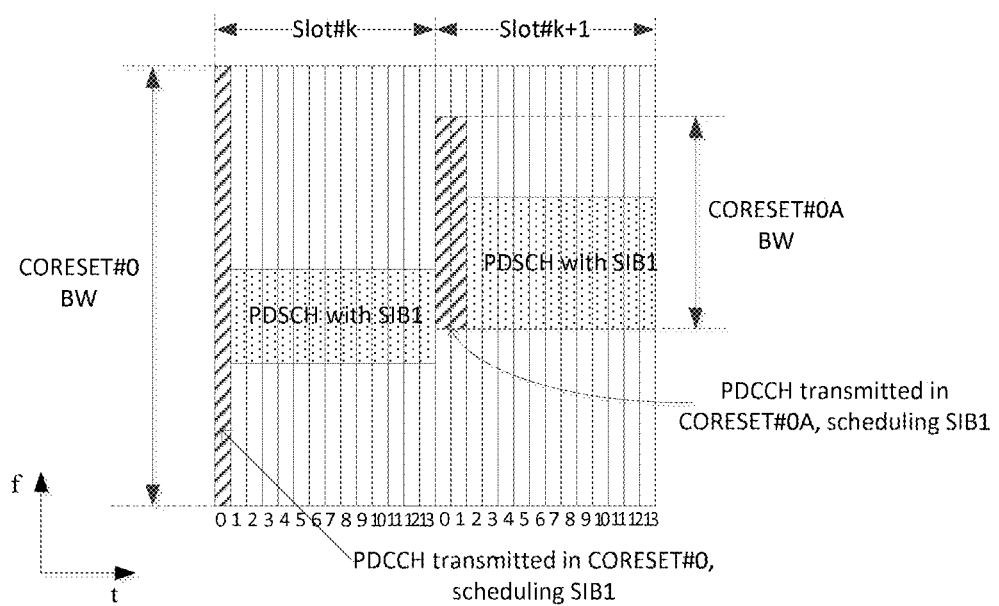
FIG. 5 illustrates exemplary radio resources allocation in accordance with some embodiments of the present disclosure.

FIGS. 4 and 5 illustrate exemplary OFDM radio resources allocation in accordance with some embodiments of the present disclosure. In FIG. 4, the radio resources for SIB1 transmission in slot #k are within the bandwidth of CORSET #0A. In FIG. 5, only a part of the radio resources for SIB1 transmission in slot #k is within the bandwidth of CORESET #0A.

In the embodiments of FIGS. 4 and 5, one slot includes OFDM symbols 0~13. As shown in FIGS. 4 and 5, search space #0 associated with CORESET #0 may be configured to be located within the first symbol, symbol 0, of slot #k. The DCI carried in the PDCCH transmitted in CORESET #0 may indicate a frequency domain resource allocation for SIB1. The frequency domain resource allocation (hereinafter, "allocation #0") may indicate that SIB1 is transmitted in some PRBs from symbol 1 of slot #k to symbol 13 of slot #k, indicated as "PDSCH with SIB1" in slot #k of FIGS. 4 and 5.

A UE or base station may determine CORESET #0A and search space #0A based on the configurations for CORESET #0 and search space #0. For example, search space #0A associated with CORESET #0A may be determined to be located at the first and second symbols (i.e., symbols 0 and 1) of slot #k+1. In some other embodiments, search space #0A associated with CORESET #0A may be determined to be located at the same or different symbols of slot #k−1.

A UE may detect the DCI carried in the PDCCH transmitted in CORESET #0A, which is the same as the one transmitted in CORESET #0. A UE or base station may determine the corresponding frequency domain resource allocation (allocation #0A) for SIB1 in CORESET #0A based on the DCI or allocation #0. For example, the UE or base station may determine allocation #0A which indicates that the same SIB1 is transmitted in some PRBs from symbol 2 of slot #k+1 to symbol 13 of slot #k+1, indicated as "PDSCH with SIB1" in slot #k+1 of FIGS. 4 and 5.

The following is an exemplary procedure for determining allocation #0A based on the DCI or allocation #0.

As mentioned above, allocation #0 may indicate that SIB1 occupies some PRBs in CORESET #0. These PRBs may be mapped to a number of Virtual Resource Blocks (VRBs), e.g., VRB #p to VRB #p+m, wherein m represents the number of VRBs associated with allocation #0, and p represents the index of the first VRB (i.e., VRB #p) in the number of VRBs associated with allocation #0. Assuming that VRBs associated with allocation #0A are VRB #q to VRB #q+n, wherein n represents the number of VRB associated with allocation #0A, and q represents the index of the first VRB (i.e., VRB #q) in the number of VRBs associated with allocation #0A.

In some embodiments of the present disclosure, VRB-to-PRB (or PRB-to-VRB) mapping is configured as non-interleaved. In the non-interleaved scenario, a VRB (e.g., VRB #d) with index d may correspond to a PRB with the same index, i.e., PRB #d with index d; and if a PRB is within the bandwidth of a control resource set, the corresponding VRB may also be within the bandwidth of the control resource set. In these embodiments, the values of q and n may be determined as follows:

(I) assuming that VRB #p is located within the bandwidth of CORSET #0A, the VRB #p may correspond to VRB #t (corresponding to PRB #t) in CORESET #0A (that is, PRBs corresponding to VRB #p and VRB #t may have the same frequency), wherein t represents the index of VRB #t or PRB #t in CORESET #0A, if a value r is less than or equal to $N_{CORESET\ \#0A}^{size}-t$, q=t and n=r; and if a value r is greater than $N_{CORESET\ \#0A}^{size}-t$, q=0 and n=min ($N_{CORESET\ \#0A}^{size}$, r); and (II) assuming that VRB #p is located outside the bandwidth of CORSET #0A, q=0 and n=min ($N_{CORESET\ \#0A}^{size}$, r), wherein $N_{CORESET\ \#0A}^{size}$ represents the bandwidth of CORESET #0A in term of RBs, that is, a number of VRBs or PRBs within the bandwidth of CORESET #0A; and wherein r may be determined or deduced based on the value of m, the number of symbols in CORSET #0, and the number of symbols in CORSET #0A, and may follow the principle that the radio resources (e.g., the number of resource elements) for SIB1 allocated in the bandwidth of CORESET #0A shall be greater than or equal to those allocated in the bandwidth of CORESET #0. For example, the value of r may be determined as follows:

assuming that in slot #k, the number of OFDM symbols for SIB1 transmission excluding the symbols with Demodulation Reference Signal (DMRS) is A1, the number of resource elements (i.e., subcarriers) for SIB1 transmission in slot #k is m*A1*B1, wherein B1 represents the number of subcarriers in a resource block (RB) and may be 12; and assuming that in slot #k+1, the number of OFDM symbols for SIB1 transmission is A2, r=ceil (m*A1*B1/A2), wherein the ceil ( ) function returns the smallest integer value that is bigger than or equal to the value of m*A1*B1/A2.

In some embodiments of the present disclosure, the value of q may always be zero ("0"), which indicates that VRB #q is the VRB with least frequency in CORSET #0A. In these embodiments, the value of n may be min ($N_{CORESET\ \#0A}$,r).

The above exemplary method for determining the values of q and n is based on the assumption that VRB-to-PRB mapping is configured as non-interleaved. However, in some embodiments of the present disclosure, VRB-to-PRB mapping may be configured as interleaved. The above exemplary method may also be applied to these embodiments. Corresponding modifications to the above exemplary method may be apparent to persons skilled in the art to serve the scenario of interleaved VRB-to-PRB mapping.

Figure 6:
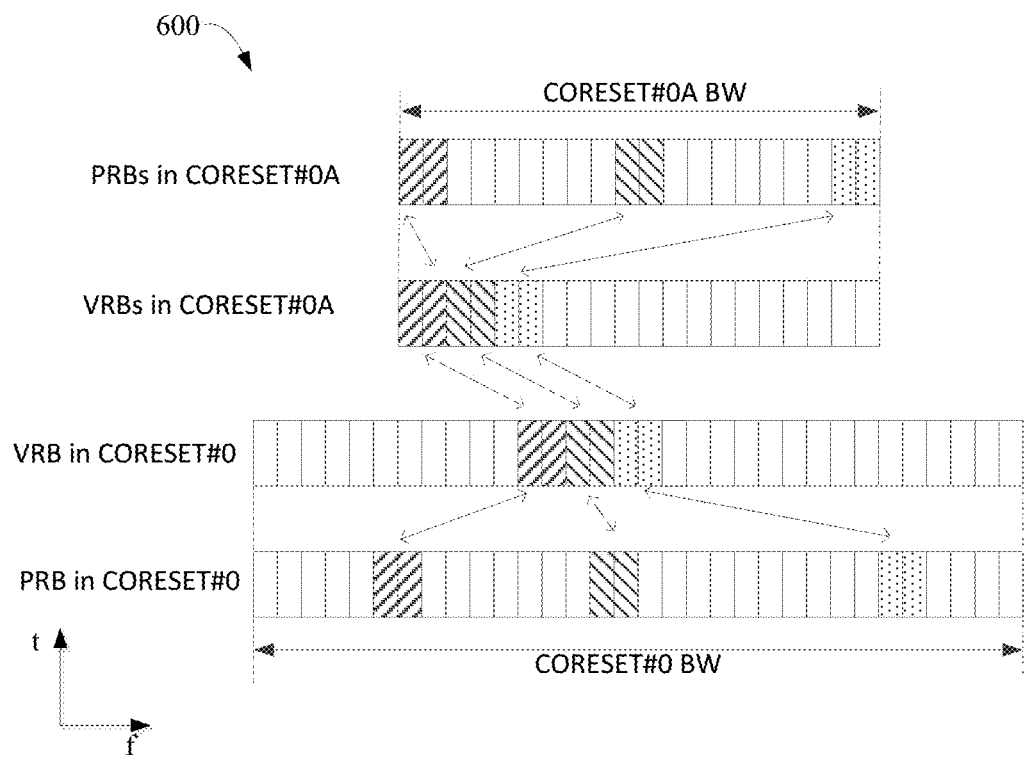
FIG. 6 illustrates an exemplary resource block mapping scheme in accordance with some embodiments of the present disclosure.

FIG. 6 shows an exemplary resource block mapping scheme 600 in accordance with some embodiments of the present disclosure.

As shown in FIG. 6, the VRB-to-PRB mapping in CORESET #0 and CORESET #0A is interleaved. The VRBs in CORESET #0 may be determined from PRBs in CORESET #0 based on a predetermined interleaving rule; or vice versa. The VRBs in CORESET #0A may be determined from VRBs in CORESET #0 according to the above exemplary method. As shown in FIG. 6, the first six VRBs, which may be indexed as VRB #0 to VRB #5 (not shown in FIG. 6), in CORESET #0A may be determined from the corresponding VRBs allocated in CORESET #0. The PRBs in CORESET #0A may be determined from the same or different predefined interleaving rule.

In some embodiments of the present disclosure, when VRB-to-PRB mapping is configured as interleaved, the UE or the base station may determine the VRBs (e.g., VRB #q to VRB #q+n) associated with CORESET #0A according to the above method. However, the UE or the base station may interpret VRB-to-PRB mapping in CORESET #0A as non-interleaved for frequency resource allocation. In other words, the UE or the base station may map VRB #q to VRB #q+n to PRBs in CORESET #0A in a non-interleaved manner.

In some embodiments of the present disclosure, when VRB-to-PRB mapping is configured as interleaved, the UE or the base station may determine the VRBs (e.g., VRB #q to VRB #q+n) associated with CORESET #0A according to the above method, and may map these VRBs to corresponding PRBs in CORESET #0A according to the predefined interleaving rule.

Figure 7:
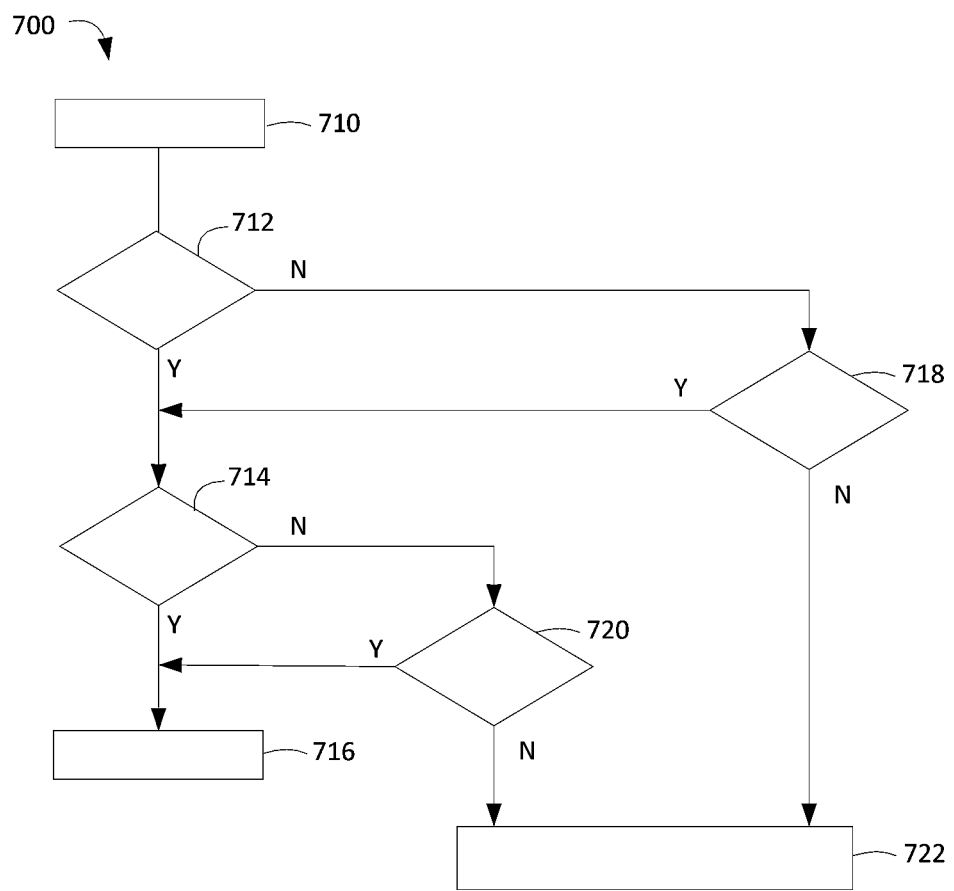
FIG. 7 illustrates a flow chart of an exemplary procedure of handling communications according to some embodiments of the present disclosure.

FIG. 7 illustrates a flow chart of an exemplary procedure 700 of handling communications according to some embodiments of the present disclosure.

In some embodiments of the present disclosure, the exemplary procedure 700 may occur after a UE determines the configurations of CORESET #0A and search space #0A based on configurations for CORESET #0 and search space #0. For example, referring back to FIG. 4, CORESET #0 may be configured to be located at symbol 0 of slot #k, and CORESET #0A may be determined to be located at symbols 0 and 1 of slot #k+1.

Referring to FIG. 7, in operation 710, a UE may store data transmitted within the bandwidth of CORESET #0A in CORESET #0 within search space #0. In operation 712, the UE may detect DCI (or PDCCH) transmitted within CORESET #0A in search space #0A. If the DCI is detected, the procedure 700 may go to operation 714. Otherwise, if it fails to detect the DCI, the procedure 700 may go to operation 718.

In operation 714, the UE may determine a frequency domain resource allocation (allocation #0A) within a bandwidth of CORESET #0A based on the DCI. The exemplary procedure for determining the frequency domain resource allocation based on the DCI as described above may apply here. For example, the UE may determine a corresponding frequency domain resource allocation (allocation #0) within a bandwidth of CORESET #0 based on the DCI, and may deduce allocation #0A based on allocation #0.

The UE may detect SIB1 (or PDSCH) based on the allocation #0A. If the SIB1 is detected, the procedure 700 may go to operation 716. Otherwise, if it fails to detect the SIB1, the procedure 700 may go to operation 720. In operation 716, the UE may receive the SIB1 (or PDSCH) transmission according to allocation #0A.

In operation 718, the UE may combine soft information for DCI transmission within CORESET #0 (which is stored at the UE in operation 710) with soft information for DCI transmission within CORESET #0A. The UE may obtain the DCI based on the combined soft information. If the DCI is successfully obtained, the procedure 700 may go to operation 714; otherwise, the procedure 700 may go to operation 722. In operation 722, the DCI detection is failed and the UE may release buffered data.

In operation 720, the UE may determine a frequency domain resource allocation (allocation #0) within a bandwidth of CORESET #0 based on the DCI. The UE may combine soft information for SIB1 transmission within CORESET #0A according to allocation #0A with soft information for SIB1 transmission within CORESET #0A according to allocation #0. The UE may obtain the SIB1 transmission based on the combined soft information. If the SIB1 is successfully obtained, the procedure 700 may go to operation 716; otherwise, the procedure 700 may go to operation 722. In operation 722, the SIB1 detection is failed and the UE may release buffered data.

For example, referring back to FIG. 4, as mentioned above, a UE may determine the configurations of CORESET #0A and search space #0A based on configurations for CORESET #0 and search space #0. The UE may store data transmitted in the bandwidth of CORESET #0A in slot #k, and may detect DCI (or PDCCH) within CORESET #0A in slot #k+1. If the DCI is successfully detected and obtained, the UE may determine a frequency domain resource allocation (allocation #0A) for SIB transmission in slot #k+1 based on the DCI. If it fails to detect the DCI, the DCI detection may fail, and the UE may release buffered data; or the UE may perform soft combination to obtain the DCI. For example, the UE may combine soft information for DCI transmission in CORESET #0A (in slot #k+1) with soft information for DCI transmission in CORESET #0 (in slot #k within the bandwidth of CORESET #0A). The UE may obtain the DCI based on the combined soft information. However, if it still fails to obtain the DCI, the DCI detection may fail.

After obtaining the DCI, the UE may detect SIB1 transmitted within CORESET #0A in slot #k+1 according to the frequency domain resource allocation (allocation #0A). If the SIB1 is successfully detected, the UE may obtain the SIB1. If it fails to detect the SIB1, the SIB1 detection may fail, and the UE may release buffered data; or the UE may combine soft information to obtain the SIB1. For example, the UE may combine soft information for SIB1 transmission in CORESET #0A (in slot #k+1) with soft information for SIB1 transmission in CORESET #0 (in slot #k within the bandwidth of CORESET #0A). The UE may obtain the SIB1 based on the combined soft information. However, if it still fails to obtain the SIB1, the SIB1 detection may fail.

Details described in all the foregoing embodiments of the present disclosure (for example, how to determine configurations of CORESET #0A and search space #0A, and how to determine frequency domain resource allocation for SIB1 in CORESET #0A) are applicable for the embodiments as shown in FIG. 7.

Although the exemplary procedure 700 shows operations 710-722, it should be appreciated by persons skilled in the art that the sequence of the operations may be changed and some of the operations 710-722 may be eliminated, without departing from the spirit and scope of the disclosure. For example, in some embodiments of the present disclosure, operations such as operations 710, 718, and 720 may be eliminated when soft combination does not apply.

Figure 7A:
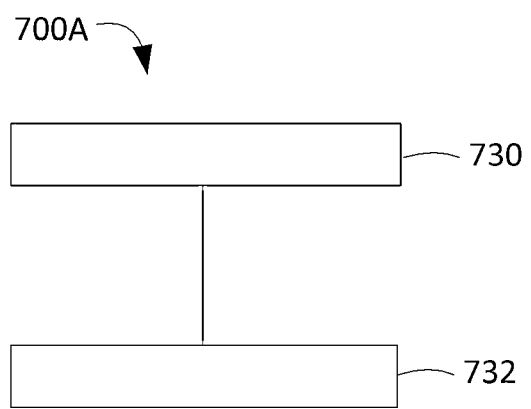
FIG. 7A illustrates a flow chart of an exemplary procedure of handling communications according to some embodiments of the present disclosure.

FIG. 7A illustrates a flow chart of an exemplary procedure 700A of handling communications according to some embodiments of the present disclosure.

In operation 730, a base station may broadcast configuration information indicating a control resource set (e.g., CORESET #0) and a search space (e.g., search space #0) associated with the control resource set. For example, the configuration information may be broadcast via a physical broadcast channel in a synchronization signal block.

In operation 732, the base station may transmit a downlink control channel (e.g., PDCCH) within another control resource set (e.g., CORESET #0A) in another search space (e.g., search space #0A). The base station may determine the another control resource set based on the control resource set and may determine the another search space based on the search space.

In some embodiments of the present disclosure, the control resource set and the another control resource set may have the same numerology. In some embodiments of the present disclosure, the number of symbols for the another control resource set may be determined based on the number of symbols for the control resource set. In some embodiments of the present disclosure, the control resource set and the another control resource set may have the same physical downlink control channel (PDCCH) monitoring periodicity. In some embodiments of the present disclosure, a first monitoring occasion for the another search space is located in a first slot, and a second monitoring occasion for the search space is located in a second slot, wherein the first slot is located right after or right before the second slot.

In some embodiments of the present disclosure, the base station may transmit a downlink control channel within the control resource set (e.g., CORESET #0) in the search space (e.g., search space #0). The control information (e.g., DCI) on the downlink control channel transmitted in the search space may be the same as the control information on the downlink control channel transmitted in the another search space.

The control information may indicate frequency domain resource allocation (e.g., allocation #0) within the bandwidth of the control resource set (e.g., CORESET #0). The base station may transmit a downlink shared channel (e.g., SIB1) based on the frequency domain resource allocation.

In some embodiments of the present disclosure, the base station may determine another frequency domain resource allocation (e.g., allocation #0A) within a bandwidth of the another control resource set based on the control information. For example, the base station may determine the another frequency domain resource allocation (e.g., allocation #0A) based on the frequency domain resource allocation (e.g., allocation #0). The base station may apply abovementioned exemplary procedure for determining the another frequency domain resource allocation. The base station may transmit a downlink shared channel (e.g., SIB1) based on the another frequency domain resource allocation.

Details described in all the foregoing embodiments of the present disclosure (for example, how to determine configurations of CORESET #0A and search space #0A, and how to determine frequency domain resource allocation for SIB1 in CORESET #0A) are applicable for the embodiments as shown in FIG. 7A.

Although the exemplary procedure 700A shows operations 730 and 732, it should be appreciated by persons skilled in the art that the sequence of the operations may be changed and some of the operations 730 and 732 may be eliminated, without departing from the spirit and scope of the disclosure.

Figure 8:
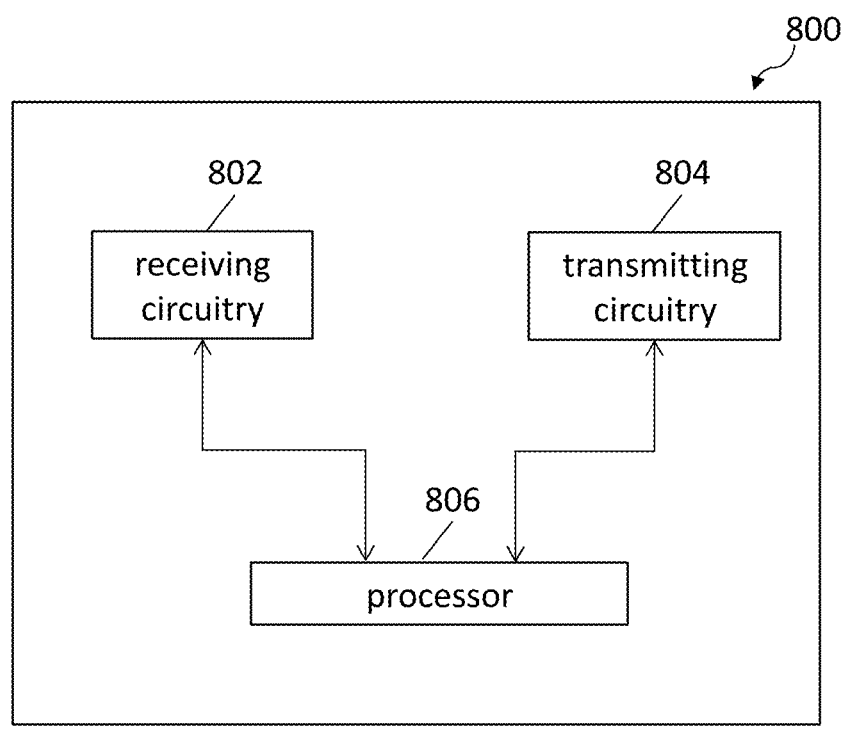
FIG. 8 illustrates a block diagram of an exemplary apparatus in accordance with some embodiments of the present disclosure.

FIG. 8 illustrates an example block diagram of an apparatus 800 according to some embodiments of the present disclosure.

As shown in FIG. 8, the apparatus 800 may include at least one non-transitory computer-readable medium (not illustrated in FIG. 8), a receiving circuitry 802, a transmitting circuitry 804, and a processor 806 coupled to the non-transitory computer-readable medium (not illustrated in FIG. 8), the receiving circuitry 802 and the transmitting circuitry 804. The apparatus 800 may be a BS or a terminal device (e.g., a NR-Light UE or a legacy UE).

Although in this figure, elements such as processor 806, transmitting circuitry 804, and receiving circuitry 802 are described in the singular, the plural is contemplated unless limitation to the singular is explicitly stated. In some embodiments of the present disclosure, the receiving circuitry 802 and the transmitting circuitry 804 are combined into a single device, such as a transceiver. In certain embodiments of the present disclosure, the apparatus 800 may further include an input device, a memory, and/or other components.

In some embodiments of the present disclosure, the non-transitory computer-readable medium may have stored thereon computer-executable instructions to cause a processor to implement the operations with respect to the UE as described above. For example, the computer-executable instructions, when executed, cause the processor 806 interacting with receiving circuitry 802 and transmitting circuitry 804, so as to perform the steps in FIG. 7. For example, the processor 806 determines CORESET #0A based on configuration information associated with CORESET #0; and determining a search space associated with CORESET #0A based on configuration information associated with another search space associated with CORESET #0.

In some embodiments of the present disclosure, the non-transitory computer-readable medium may have stored thereon computer-executable instructions to cause a processor to implement the method with respect to the BS as described above. For example, the computer-executable instructions, when executed, cause the processor 806 interacting with receiving circuitry 802 and transmitting circuitry 804, so as to perform the steps in FIG. 7A. For example, the transmitting circuitry 804 broadcasts configuration information indicating CORESET #0 and a second search space associated with CORESET #0, and the transmitting circuitry 804 transmits a downlink control channel within CORESET #0A in a first search space, wherein the CORESET #0A is based on CORESET #0 and the first search space is based on the second search space.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

What is claimed is:

1. A user equipment (UE) for wireless communication, comprising:
   at least one memory; and
   at least one processor coupled with the at least one memory and configured to cause the UE to:
      determine a first control resource set (CORESET) based on configuration information associated with a second CORESET; and
      determine a first search space based on configuration information associated with a second search space, wherein the first CORESET is associated with the first search space and the second CORESET is associated with the second search space, and wherein downlink control information (DCI) detected in the first search space associated with the first CORESET and DCI detected in the second search space associated with the second CORESET comprise a same DCI.

2. The UE of claim 1, wherein the first CORESET and the second CORESET have a same numerology.

3. The UE of claim 1, wherein a number of symbols for the first CORESET is determined based on a number of symbols for the second CORESET.

4. The UE of claim 1, wherein the first search space and the second search space have a same physical downlink control channel (PDCCH) monitoring periodicity.

5. The UE of claim 1, wherein a first monitoring occasion for the first search space is located in a first slot, a second monitoring occasion for the second search space is located in a second slot, and the first slot is located right after or right before the second slot.

6. The UE of claim 1, wherein the at least one processor is further configured to cause the UE to:
   detect the DCI within the first CORESET;
   determine a first frequency domain resource allocation within a bandwidth of the first CORESET based on the DCI; and
   detect a physical downlink shared channel (PDSCH) transmission based on the first frequency domain resource allocation.

7. The UE of claim 6, wherein the at least one processor is further configured to cause the UE to:
   store data transmitted within a bandwidth of the first CORESET in the second CORESET; and
   if the DCI is not detected:
      combine soft information for DCI transmission within the first CORESET with soft information for DCI transmission within the second CORESET; and
      obtain the DCI based on the combined soft information.

8. The UE of claim 6, wherein the at least one processor is further configured to cause the UE to:
   store data transmitted within a bandwidth of the first CORESET in the second CORESET; and
   if the PDSCH transmission is failed,
      determine a second frequency domain resource allocation based on the DCI;
      combine soft information for PDSCH transmission within the first CORESET according to the first frequency domain resource allocation with soft information for PDSCH transmission within the first CORESET according to the second frequency domain resource allocation; and
      obtain the PDSCH transmission based on the combined soft information.

9. The UE of claim 6, wherein to determine the first frequency domain resource allocation based on the DCI comprises to:
   determine a second frequency domain resource allocation within a bandwidth of the second CORESET based on the DCI; and
   deduce the first frequency domain resource allocation based on the second frequency domain resource allocation.

10. A base station (BS) for wireless communication, comprising:
    at least one memory; and
    at least one processor coupled with the at least one memory and configured to cause the BS to:
       broadcast configuration information indicating a second control resource set (CORESET) and a second search space, wherein the second search space is associated with the second CORESET; and
       transmit a downlink control channel within a first CORESET in a first search space, wherein the first CORESET is based on the second CORESET and the first search space is based on the second search space, and wherein downlink control information (DCI) transmitted in the first search space associated with the first CORESET and DCI transmitted in the second search space associated with the second CORESET comprise a same DCI.

11. The BS of claim 10, wherein the first CORESET and the second CORESET have a same numerology.

12. The BS of claim 10, wherein a number of symbols for the first CORESET is determined based on a number of symbols for the second CORESET.

13. The BS of claim 10, wherein the first search space and the second search space have a same physical downlink control channel (PDCCH) monitoring periodicity.

14. The BS of claim 10, wherein a first monitoring occasion for the first search space is located in a first slot, a second monitoring occasion for the second search space is located in a second slot, and the first slot is located right after or right before the second slot.

15. The BS of claim 10, wherein control information on a downlink control channel transmitted in the first search space comprises a same control information as control information on a downlink control channel transmitted in the second search space.

16. The BS of claim 15, wherein the at least one processor is further configured to cause the BS to:
   determine a first frequency domain resource allocation within a bandwidth of the first CORESET based on the control information; and
   transmit a downlink shared channel based on the first frequency domain resource allocation.

17. The BS of claim 16, wherein to determine the first frequency domain resource allocation based on the control information comprises to:
   determine the first frequency domain resource allocation based on a second frequency domain resource allocation, wherein the second frequency domain resource allocation is within a bandwidth of the second CORESET indicated by the control information.

18. A method performed by a user equipment (UE), comprising:
   determining a first control resource set (CORESET) based on configuration information associated with a second CORESET; and
   determining a first search space based on configuration information associated with a second search space, wherein the first CORESET is associated with the first search space and the second control CORESET is associated with the second search space, and wherein downlink control information (DCI) detected in the first search space associated with the first CORESET and DCI detected in the second search space associated with the second CORESET comprise a same DCI.

19. A method performed by a base station (BS), the method comprising:
   broadcasting configuration information indicating a second control resource set (CORESET) and a second search space, wherein the second search space is associated with the second CORESET; and
   transmit a downlink control channel within a first CORESET in a first search space, wherein the first CORESET is based on the second CORESET and the first search space is based on the second search space, and wherein downlink control information (DCI) transmitted in the first search space associated with the first CORESET and DCI transmitted in the second search space associated with the second CORESET comprise a same DCI.

20. The BS of claim 19, wherein the first search space and the second search space have a same physical downlink control channel (PDCCH) monitoring periodicity.

* * * * *